(12) United States Patent
Ahn

(10) Patent No.: US 7,770,226 B2
(45) Date of Patent: Aug. 3, 2010

(54) METHOD OF SYNCHRONIZING DATA BETWEEN CONTENTS PROVIDERS AND A PORTABLE DEVICE VIA NETWORK AND A SYSTEM THEREOF

(75) Inventor: Sung Min Ahn, Seoul (KR)

(73) Assignee: Inka Entworks, Inc. (KR)

( * ) Notice: Subject to any disclaimer, the term of this patent is extended or adjusted under 35 U.S.C. 154(b) by 1370 days.

(21) Appl. No.: 10/548,233

(22) PCT Filed: Sep. 30, 2004

(86) PCT No.: PCT/KR2004/002505

§ 371 (c)(1),
(2), (4) Date: Sep. 2, 2005

(87) PCT Pub. No.: WO2005/031593

PCT Pub. Date: Apr. 7, 2005

(65) Prior Publication Data

US 2006/0277598 A1    Dec. 7, 2006

(30) Foreign Application Priority Data

Sep. 30, 2003    (KR) ............... 10-2003-0067828

(51) Int. Cl.
*G06F 17/30* (2006.01)
(52) U.S. Cl. ............. 726/26; 726/5; 713/182; 380/201
(58) Field of Classification Search .......... 726/5–7, 726/26; 713/182–183, 193, 189; 705/59, 705/51, 57, 67; 380/201, 229, 232
See application file for complete search history.

(56) References Cited

U.S. PATENT DOCUMENTS

| 6,697,944 B1 * | 2/2004 | Jones et al. ............. 713/168 |
| 2003/0014630 A1 * | 1/2003 | Spencer et al. ......... 713/168 |
| 2003/0028395 A1 | 2/2003 | Rodgers et al. |

FOREIGN PATENT DOCUMENTS

| KR | 2002-88737 A | 11/2002 |
| KR | 2003-15742 A | 2/2003 |
| KR | 2003-42769 A | 6/2003 |

OTHER PUBLICATIONS

International Search Report and Written Opinion of the International Searching Authority for PCT/KR04/02505, dated Jan. 7, 2005; ISA/KR.

* cited by examiner

*Primary Examiner*—Kimyen Vu
*Assistant Examiner*—Baotran N To
(74) *Attorney, Agent, or Firm*—Harness, Dickey & Pierce, P.L.C.

(57) ABSTRACT

The present invention relates to a method and system of synchronizing data between a contents providing system and a portable device via network. More particularly, the present invention relates to a method and system of transmitting predetermined data of contents, which requires digital rights protection, to a portable device, wherein a contents providing system and a synchronization information system are connected with a synchronization client installed in a computer to which the portable device is connected.

1 Claim, 10 Drawing Sheets

PRIOR ART

Synchronization information system

METHOD OF SYNCHRONIZING DATA BETWEEN CONTENTS PROVIDERS AND A PORTABLE DEVICE VIA NETWORK AND A SYSTEM THEREOF

TECHNICAL FIELD

The present invention relates to method and system of synchronizing data between contents providing system and a portable device via network. More particularly, the present invention relates to method and system of transmitting predetermined contents data, which require digital rights protection, to a portable device, wherein a contents providing system and a synchronization information system are connected with a synchronization client installed in a personal computer to which the portable device is connected.

BACKGROUND OF THE ART

A method for managing data recorded in a portable device such as a MP3 player, a PDA, a handheld PC, a mobile communication device, etc, generally, includes a method of synchronizing data or files between a personal computer (PC) and the portable device. This method includes a method of connecting the personal computer to the portable device by using a wired method such as a serial port which is called as cradle synchronization, a universal serial bus (USB) port, etc, or a method of connecting the personal computer to the portable device by using a wireless method such as an infrared port, Wi-Fi, etc. Also, as for a method of transmitting data to the portable device, there is currently widely used a USB mass storage method that recognizes the portable device connected through the universal serial bus (USB) or the like in a computer as one mass storage and transmits a file or data freely. It is apparent to those skilled in the art that transmission of files or data using this USB mass storage method transmits only files or data simply, wherein there is not supported algorithm that can secure the transmitted file or data, or can protect digital rights thereof.

Various methods are being conceived to protect an owners copyright. There is growing understanding that digital contents itself is a copyright and should be protected. With this, it is also true that users who used to consider digital contents as free of charge start to change their attitudes. Methods of protecting digital contents rights are suggested as below.

A digital rights management (hereinafter, DRM) system is suggested as one method for protecting digital contents rights. This DRM system is a kind of technology embodying a system which safely transmits various contents of a network from a contents provider (CP) to a client and prevents the client from distributing the contents illegally. An encrypting technique is most important in the DRM system. This technique encrypts/decrypts digital contents using a client's password or computer ID number as key data. Therefore, although the digital contents are copied unauthorized and distributed to the third person, he/she may use the digital contents only with the key data. A method of using this key data may include 1) a method of transforming a client's computer ID or 2) a method of using a client's public key infrastructure (PKI) key or a personal key cache.

FIG. 1 is a drawing illustrating configuration of a system for embodying a method for digital contents protection according to the prior art.

FIG. 1 is one example of a digital contents providing system using DRM. DRM center 120 links digital contents providing server 110 with payment gateway system 130 and provides copyright-protected digital contents to user 140 after encrypting the same. When user 140 requests use of digital contents such as image, audio, video, etc through a network like Internet and pays predetermined fee, DRM center 120 provides the digital contents to user 140 after encrypting the same according to predetermined algorithm. Recently, disclosed is tempering that restores a source code of digital contents by using an execute-file that is encrypted and transmitted to a user. Accordingly, DRM center 120 requires a technique for efficiently preventing a hacking technique like the tampering.

Like above, although various technologies are being developed for protecting various digital contents rights on Internet, the technologies are digital right protection methods that are performed by contents providers. Therefore, it is difficult to integrate and operate the technologies as one standard among various contents providers. In addition, an owner of digital contents may have his/her right infringed unjustly because digital right protection is weakened due to various methods such as the aforementioned tempering technique or the like.

Furthermore, the conventional method of protecting digital contents right uses a respectively different method for each contents providing system. Therefore, a plurality of decryption modules may be mounted on a portable device in order to play digital contents which are encrypted in various formats. On the contrary, if the number of decryption modules is limited to be mounted on the portable device, the number of digital contents which is unplayable may increase.

Furthermore, if the number of contents providing systems increases, a user may remember user IDs and passwords as many as the number of contents providing systems in order to use the digital contents.

In order to solve the aforementioned problems in the prior art, there has been strong desire for solution which not only can support digital contents, but also can manage channels of synchronizing data between a plurality of contents providing systems, wherein the digital contents is encrypted in various formats for using contents that requires digital right protection.

DISCLOSURE OF THE INVENTION

Technical Questions

According to the present invention, a method and a system of synchronizing data between a contents providing system and a portable device via a network is conceived to solve the aforementioned problems in the prior art. The present invention may provide a method of decrypting digital contents encrypted into various formats in one synchronization client and of transmitting the digital contents to a personal device.

Further, according to the present invention, the method and the system decrypts digital contents encrypted into various formats in one synchronization client and transmits the encrypted digital contents to the personal device after encrypting the decrypted digital contents in a predetermined DRM method. In addition, the method and system enables the portable device to play the encrypted digital contents through one decryption module. Therefore, the present invention may protect digital right more strongly and support the DRM method of various formats.

Furthermore, according to the present invention, the method and the system enables at least one digital contents to be transmitted from at least one contents providing system if there is one-connection through one synchronization client. Therefore, the present invention can reduce the inconvenience of a user who should input a user D and a password separately in the conventional contents providing systems and enable the user to receive digital contents which the user wants to use through one logic channel.

Furthermore, according to the present invention, the method and the system decrypts digital contents encrypted into various formats in one synchronization client, encrypts the decrypted digital contents so that the same may be usable only in a predetermined portable device, and transmits the encrypted digital contents to the portable device, wherein the portable device is enabled to play the encrypted digital contents through one decryption module. Therefore, the present invention may protect digital rights more strongly and support the DRM method of various formats.

Furthermore, according to the present invention, the method and system is accessible only when digital contents encrypted into various formats is decrypted in one synchronization client and the decrypted digital contents is encrypted. Therefore, the present invention may prevent unauthorized copy of digital contents which may be caused by unauthorized access to the decrypted file data.

Technical Solutions

In order to achieve the aforementioned objects, according to one preferred embodiment of the present invention, a method of operating contents providing system which provides contents to a portable device via a network comprises the steps of maintaining a user information database recording user authentication information or contents list information that the user can use, wherein the user authentication information includes at least one among a user D, a password and the user's portable device ID—the portable device ID has unique value; receiving login information including information about contents to be synchronized or user authentication information from a synchronization client; authenticating a user corresponding to the user authentication information that is included in the login information by referring to the user information database; searching the contents list information corresponding to the contents information which is included in the login information by referring to the user information database; controlling a file server so as to transmit file data corresponding to the contents list information, which is stored in the file server, to the synchronization client after encrypting the file data; and updating the contents list information, which is stored in the user information database, in accordance with the transmitted file data. Herein, the synchronization client comprises at least one decryption module for decrypting the encrypted file data transmitted from the contents proving system and an encryption module for encrypting the decrypted file data through the decryption module by using the user authentication information and for transmitting the same to the portable device.

Furthermore, according to one aspect of the present invention, a method of operating a synchronization client which synchronizes data between a contents providing system and a portable device via a network comprises the steps of detecting connection of the portable device and updating a session therewith; transmitting login information including user authentication or contents information to be synchronized to a contents providing system after receiving the login information from the portable device, wherein the user authentication information includes at least one among a user ID, a password and the user's portable device ID—the portable device ID has unique value: receiving file data corresponding to the user authentication information or the contents information included in the login information from the contents providing system; encrypting the received file data through a predetermined encryption module using the user authentication information, wherein the predetermined encryption module operates corresponding to a decryption module of the portable device; and transmitting the encrypted file data to the portable device, wherein the encrypted file data is decrypted through the predetermined decryption module of the portable device.

According to another aspect of the present invention, a method of synchronizing data between a contents providing system and a portable device via a network comprises the steps of maintaining at least one decryption module, wherein the decryption module operates corresponding to an encryption module of the contents providing system; transmitting user authentication information and contents information to a predetermined contents providing system, wherein the user authentication information includes at least one among a user ID, password or the user's portable device ID—the portable device ID has unique value; receiving encrypted file data corresponding to the contents information from the contents providing system; controlling other application's access to the decryption module; decrypting the encrypted file data through the decryption module corresponding to the encrypted file data; encrypting the decrypted file data by using user authentication information of the portable device, wherein the user authentication information includes at least one among a user ID, a password and the user's portable device ID and the encryption module operates corresponding to the decryption module of the portable device; and transmitting the encrypted file data to the portable device.

According to another aspect of the present invention, the method further comprises the steps of receiving decrypted file data from a predetermined decryption package; encrypting the decrypted contents data by using user authentication information of the portable device, wherein the user authentication information includes at least one among a user ID, a password and the user's portable device ID and the encryption module operates corresponding to the decryption module of the portable device; receiving encrypted file data from the contents providing system; controlling other application's access beside the synchronization client to the decryption module; and decrypting the encrypted file data through the decryption module corresponding to the encrypted file data.

A portable device widely used in the present specification generally means a device that is configured with a predetermined memory means such as a PDA (personal digital assistant), a MP3 player, a handheld PC, an electronic dictionary, a mobile communication device or the like and that has predetermined calculating ability through a predetermined microprocessor. In addition, data synchronization not only maintains data consistency through bi-directional communication between a portable device and a personal computer, but also transmits predetermined data or file, which is stored in the personal computer, to the portable device through predetermined client application.

Furthermore, according to the present invention, a method of transmitting predetermined file data to a portable device via a synchronization client in a contents providing system is applicable to a streaming method as well as a general downloading method. In addition, the method is applicable regardless of in which method file data is encrypted in the contents providing system.

BEST MODE FOR CARRYING OUT THE INVENTION

Hereinafter, a method of synchronizing data between a contents provider and a portable device via a network according to one preferred embodiment of the present invention will be in detail described with reference to the accompanying drawings.

Figure 1:
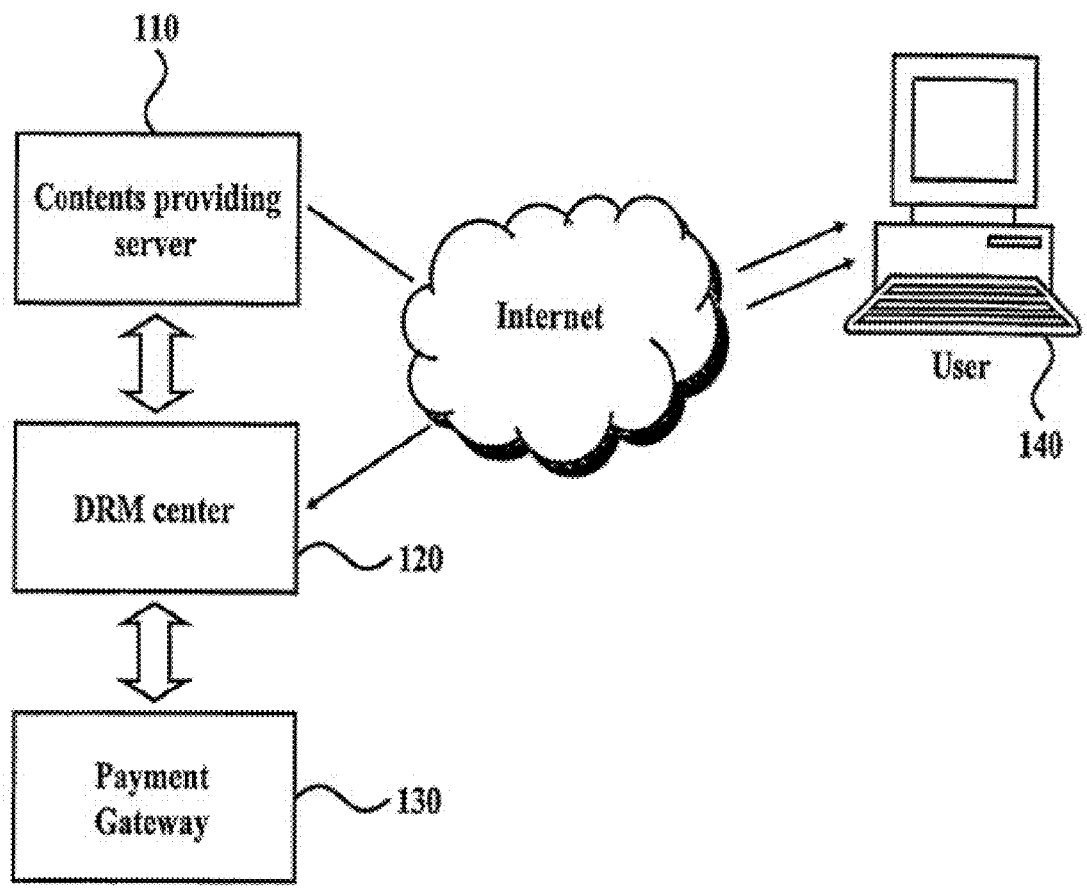
FIG. 1 is a drawing illustrating configuration of a system for embodying a method for digital contents protection according to the prior art.
Figure 2:
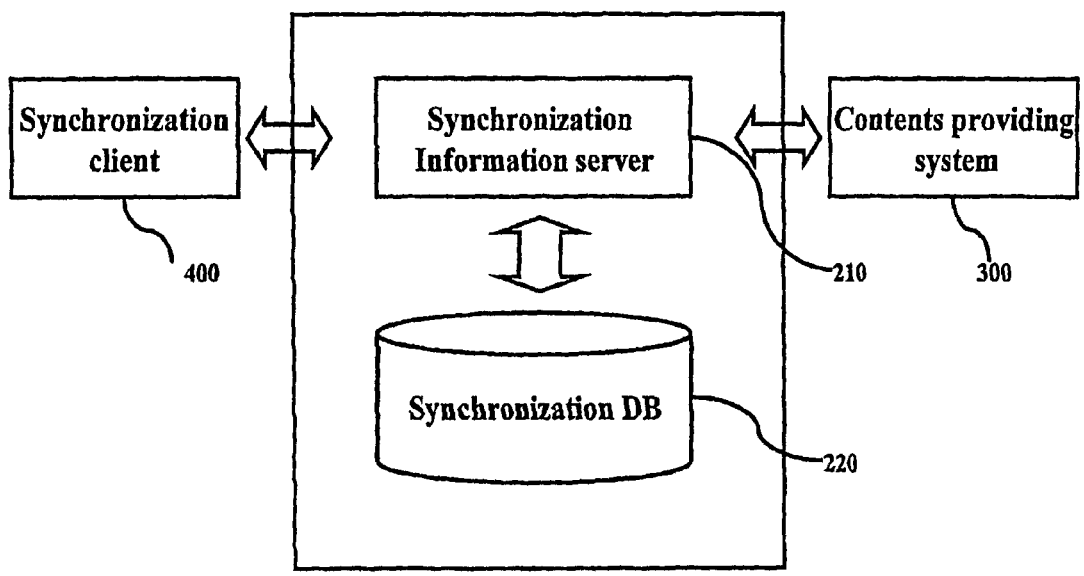
FIG. 2 is a block diagram illustrating configuration of a synchronization information system according to one preferred embodiment of the present invention.

FIG. 2 is a block diagram illustrating configuration of a synchronization information system according to one preferred embodiment of the present invention.

The synchronization information system according to the present invention is linked with at least one contents providing system 300 and at least one synchronization client 400. The synchronization information system maintains and manages information about a registered portable device or information about a user of the portable device through a synchronization service.

The synchronization information system as illustrated in FIG. 2 comprises synchronization information server 210 and synchronization information database 220.

Synchronization information server 210 receives information on a request for device registration from contents providing system 300 and records the device registration information in synchronization information database 220 according to the received information. The device registration information may comprise a user ID, a password, or a portable device ID, which is required when using service. In addition, synchronization information server 210 responds to a request of contents providing system 300 for giving a device ID to a portable device, stores the device ID and user information (a user ID, a password, or other related information) and generates the device ID and gives the generated device ID to the portable device. The aforementioned method of registering the portable device and giving the device ID will be described below with reference to FIG. 6.

Synchronization information database 220 stores user authentication information and information on contents providing system 300, DRM, application programming interface (API), the portable device related API and the like, wherein the information is required for synchronizing contents between contents providing system 300 and synchronization client 400. Moreover, according to one preferred embodiment of the present invention, synchronization information database 220 may be configured to more record a synchronization client setup program so that a user may install synchronization client 400 by receiving the same from a personal computer and. First, the user who wants to use contents synchronization service connects to the synchronization information system and downloads the synchronization client setup program which is stored in synchronization information database 220. Next, the user executes the program and installs synchronization client 400 in his/her own computer.

The synchronization information system as illustrated in FIG. 2 may be operated by an operator who is authorized by an area (e.g. a nation) who wants to provide the contents synchronization system according to the present invention. Therefore, although this synchronization information system is operated in one server logically, the system may be operated in more than one server.

Figure 3:
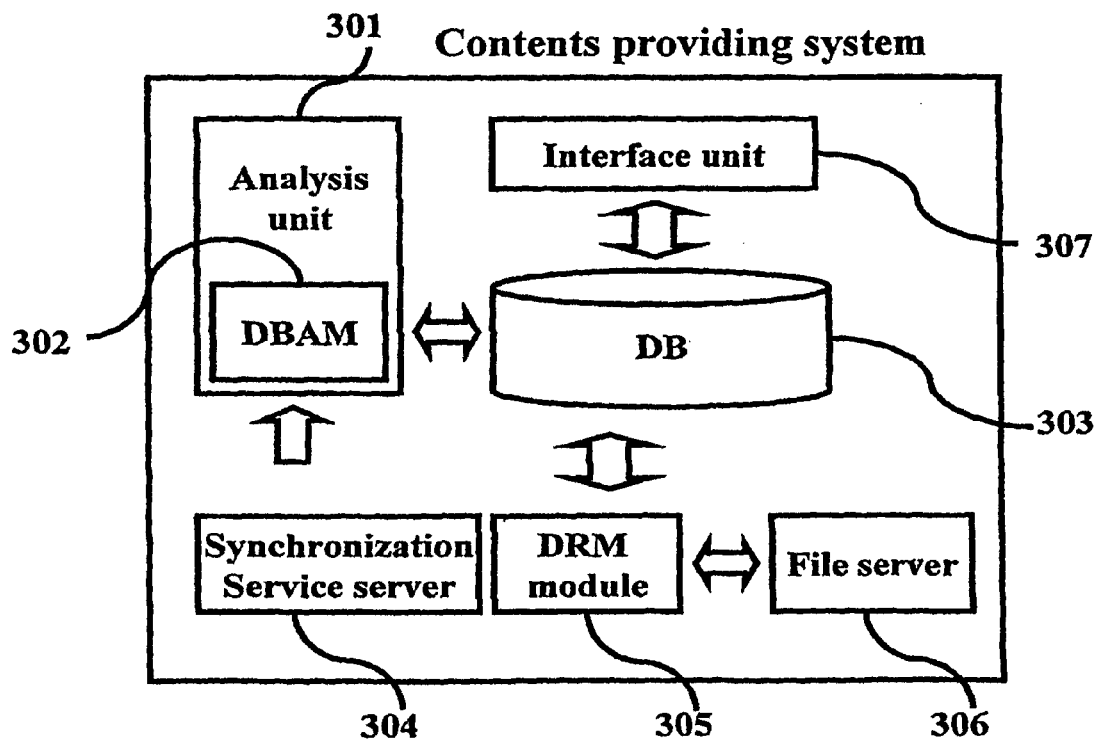
FIG. 3 is a block diagram illustrating configuration of a contents providing system according to one embodiment of the present invention.

FIG. 3 is a block diagram illustrating configuration of a contents providing system according to one embodiment of the present invention. The contents providing system may comprise analysis unit 301 including database approach module 302, database 303, synchronization service server 304, DRM module 305, and file server 306. According to one embodiment of the present invention, DRM module 305 and file server 306 may be comprised in the contents providing system according to the present invention or may be positioned in an external system which is physically remote and be operated according to control of the contents providing system of the present invention.

Analysis unit 301 stores history of operations which are performed by the contents providing system according to the present invention and provides all kinds of statistics to a system manager. According to one preferred embodiment of the present invention, analysis unit 301 may be operated based on the web. At this time, it is preferable to install a java application server.

Analysis unit 301 according to the present invention 1) stores all kinds of history information in database 303 and 2) stores information which is transmitted from a web server in database 303 and 3) reports all kinds of statistic information to the system manager based on the stored history information. In addition, analysis unit 301 further comprises the database approach control module 302 and controls approach to database 303.

Database approach control module 302 is used for accessing database 303 in the contents providing system. Database approach control module 302 may be embodied into XML-RPC (eXtended Markup Language-Remote Procedure Call) and use HTTP (Hyper Text Transfer Protocol). Therefore, database approach control module 302 may provide contents for a user who uses synchronization service according to the present invention, without interference of a security means such as a firewall in a network edge.

Database 303 may generally comprise a user information database means (not illustrated) and a synchronization channel database means (not illustrated). The user information database means is a database that stores information on a predetermined contents user, the user's contents purchase and contents purchased by the user. At this time, the information is used in synchronization service server module 304. According to one embodiment of the present invention, the user information database means may be designed to be accessible through database approach control module 302. Also, the synchronization channel database means is a database that stores information on a user's contents purchase and on contents purchased by the user, wherein the information is used in the contents providing system according to the present invention. In addition, the contents providing system according to the present invention may further comprise a database management unit (not illustrated) for managing database 303. The database management unit may be embodied for the purpose of the present invention by using a Relational Database Management System (RDBMS) such as Oracle, Infomix, Sybase, DB2, etc, or an Object-Oriented Database Management System (OODBMS) such as Orion, O2, etc.

Synchronization service server 304 according to the present invention performs parsing and analysis of all the messages that transmitted from a synchronization client through communications therewith and transmits predetermined information to the synchronization client. According to one embodiment of the present invention, although one synchronization service system may operate in one contents providing system logically, it may be designed to process requests of more than one synchronization client at the same time by using a multi-thread method. In addition, according to one embodiment of the present invention, synchronization service server 304 may be embodied into Java and operate in all the operating systems in which JVM operates. And it may be designed to minimize server loads by linking with the synchronization client in a connectionless way. Moreover, according to one preferred embodiment of the present invention, synchronization service server 304 may be a daemon server. It is apparent to those skilled in the art that the daemon server is a server program which is installed in a server to accord a client's request. INETD may be used as one method of the daemon server. When the daemon server starts, a process is loaded only if there is a client's request. Therefore, this daemon server may be slow in responding. However, the daemon server may use memory efficiently.

The synchronization service server 304 according to the present invention may be designed to 1) process connection of the synchronization client, 2) register the portable device, 3) generate lists of information which is downloadable to the portable device, 4) transmit predetermined contents to the portable device, 5) update contents information whose transmission is completed, or 6) restore a deleted device ID. Contents that is transmitted to the portable device may be grouping into in-progress contents that is being updated (educational broadcasting contents which is not over), series contents wherein a period is predetermined and every contents has been generated during the predetermined period (back issues of language contents, etc), or unitary contents (individual contents such as a song, a bell sound, background screen, etc). The aforementioned functions of 3) to 6) may be designed to be performed gradually according to grouping contents like above.

DRM module 305 encrypts contents which are recorded in file server 306. According to one preferred embodiment of the present invention, DRM module 305 may be a program which encrypts contents through a usage rule based on XrML (extensible right Markup Language). It is apparent to those skilled in the art that XrML is a language which expresses information on corresponding contents or digital right on corresponding contents. Therefore, it may be possible to give authority by using DRM and to display the fee for each authority and access condition in XrML. DRM module 305 according to the present invention gives an authentication key to a user who wants to use synchronization service according to the present invention and transmits contents that the user requests through the synchronization client to the user after encrypting the contents. According to another embodiment of the present invention, there may be used a method of transmitting contents to the synchronization client, wherein DRM module 305 is not in the contents providing system and the contents is not encrypted. That is, non-encrypted contents may be transmitted to the synchronization client. The synchronization client may encrypt the contents and transmit the encrypted contents to the portable device. The portable device may play the encrypted contents by decrypting the same using a predetermined decryption key.

File server 306 stores contents as a file, wherein the file is to be transmitted to the portable device. Contents stored in file server 306 may be stored according to an encryption method which is well-known to those skilled in the art.

DRM module 305 and the file server 306 may be inside the contents providing system. Also, they may be outside the contents providing system physically whereby DRM module 305 and file server 306 may be connected with the contents providing system according to the present invention.

Interface unit 307 is a module for performing communication with the synchronization client via a wired/wireless network. Interface unit 307 may communicate data with the synchronization client and unzip transmitted data.

Figure 4A:
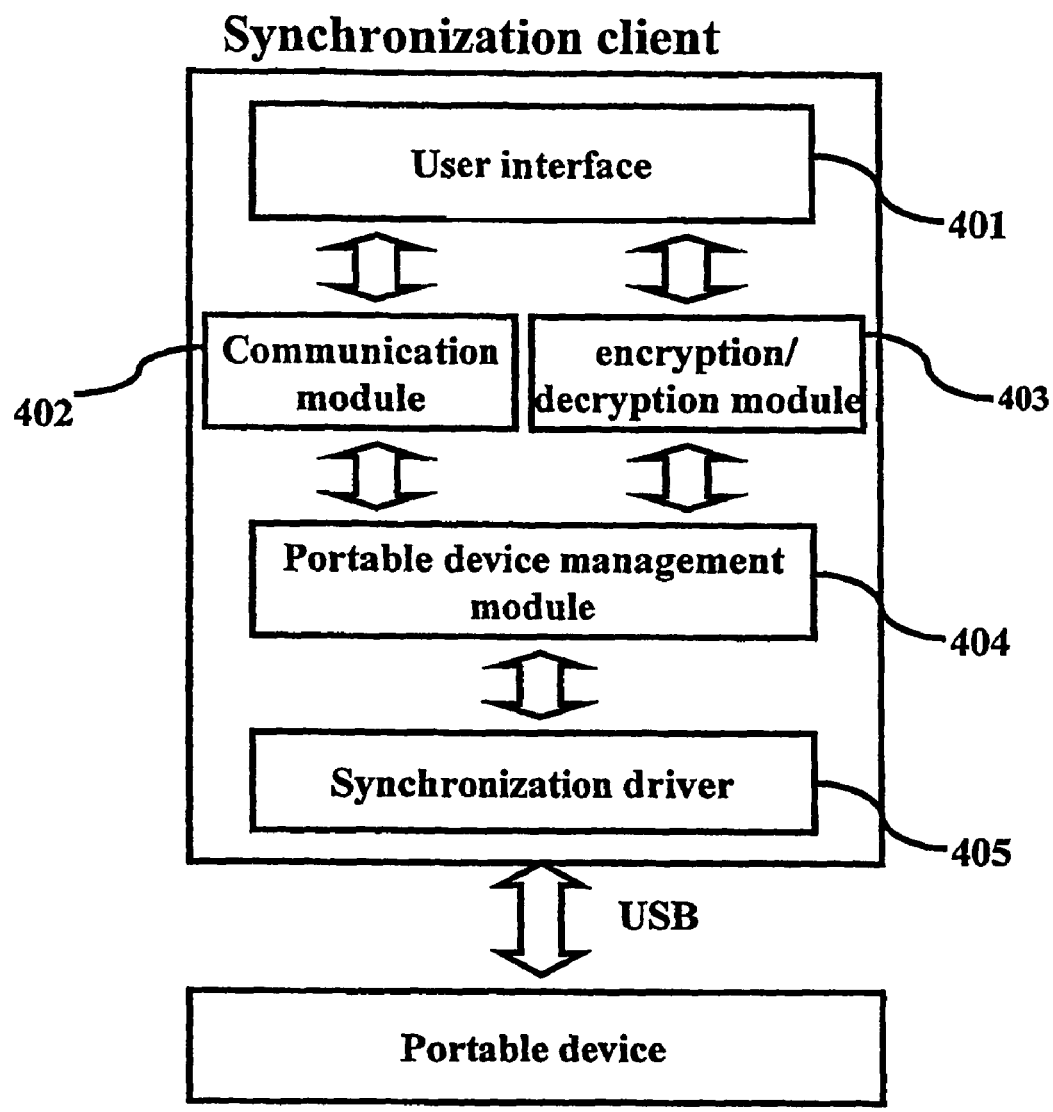
FIG. 4a is a block diagram illustrating configuration of a synchronization client installed in a user's personal computer according to one embodiment of the present invention.

FIG. 4a is a block diagram illustrating configuration of a synchronization client installed in a user's personal computer according to one embodiment of the present invention.

The synchronization client illustrated in FIG. 4a transmits predetermined contents to a user's portable device through communication with a synchronization information system or a contents providing system, wherein the predetermined contents that is designated by the user. The contents are encrypted for digital right protection. The synchronization client transmits the decrypted contents to the portable device after decrypting the encrypted contents. Various DRM methods may be adopted for each contents providing system. Therefore, the synchronization client may be designed to load a decryption module for various DRM methods in a way of API (Application Programming Interface). This decryption module may be updating continuously and, even if a new DRM method is developed, may be possible to decrypt corresponding contents through updating.

Figure 4B:
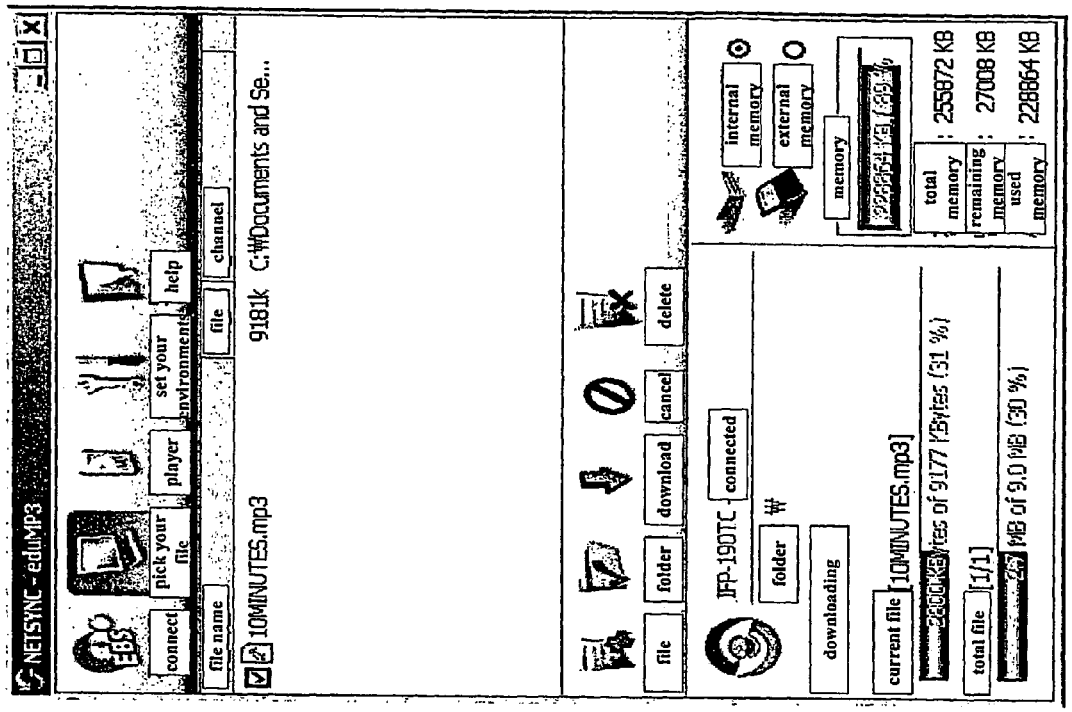
FIG. 4b is a drawing illustrating a user interface of a synchronization client according to one embodiment of the present invention.
Figure 4B:
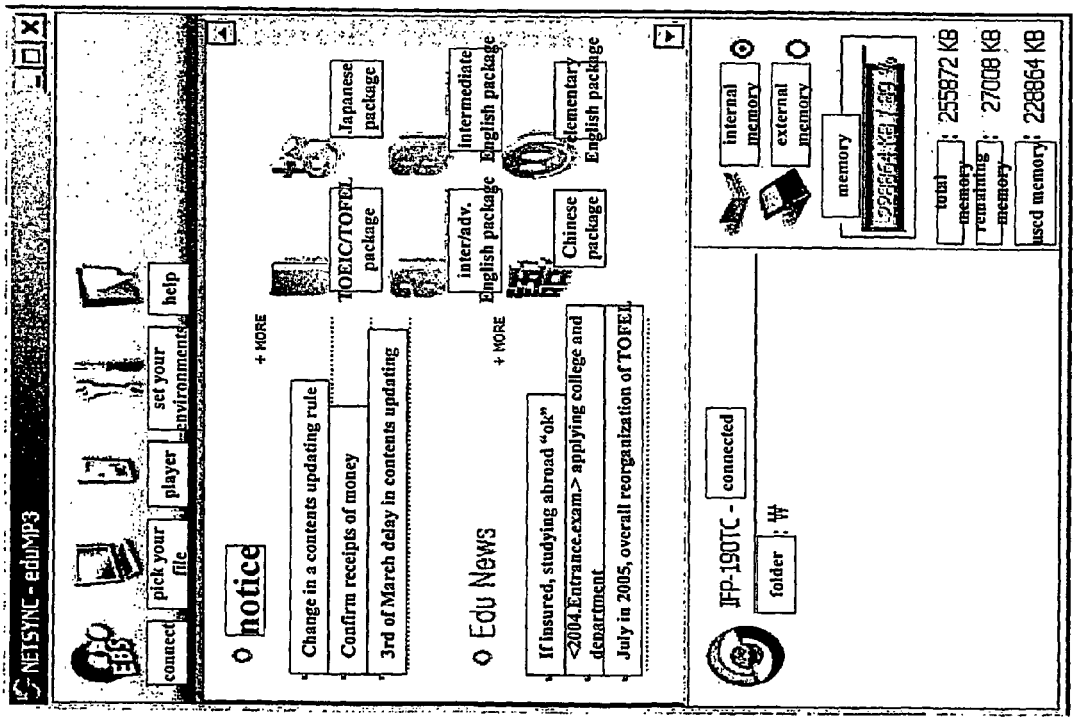

As illustrated in FIG. 4, the synchronization client according to a first embodiment of the present invention may comprise user interface 401, communication module 402, encryption/decryption module 403, portable device management module 404, and synchronization driver 404.

User interface unit 401 provides an interface so that a user may use the synchronization client easily. One example of a user interface of the synchronization client is illustrated in FIG. 4b. Referring to FIG. 4b, the left drawing of FIG. 4b is one example of FrontPage of the synchronization client and the right drawing is one example of the user interface for managing contents that the user wants to use and for controlling so that the contents may be downloaded to the user's personal computer.

Communication module 402 is a module for performing communication with a synchronization information system and a contents providing system. According to one embodiment of the present invention, communication with the aforementioned system may be performed in a way of transmitting/ receiving a XML-based message. This XML-based message may comprise login information including user authentication information or contents information, or information on a contents list, a device ID, a request for synchronization, a request for a portable device registration, etc.

Encryption/decryption module 403 is a module for decrypting contents that is encrypted into various formats, wherein the encrypted contents is transmitted from the contents providing system. Therefore, encryption/decryption module 403 may include at least one decryption API. Encryption/decryption module 403 may include the decryption module so that the same may correspond to at least one encryption module for encrypting file data corresponding to the contents in the contents providing system.

Synchronization driver 404 is a driver module for communicating data between the synchronization client and the portable device. According to one preferred embodiment of the present invention, connection between the synchronization client and the portable device may be USB. Therefore, it is apparent to those skilled in the art that USB is connected to peripheral devices of the personal computer, wherein the USB comprises a USB hub, a USB nod and a USB host.

Figure 5:
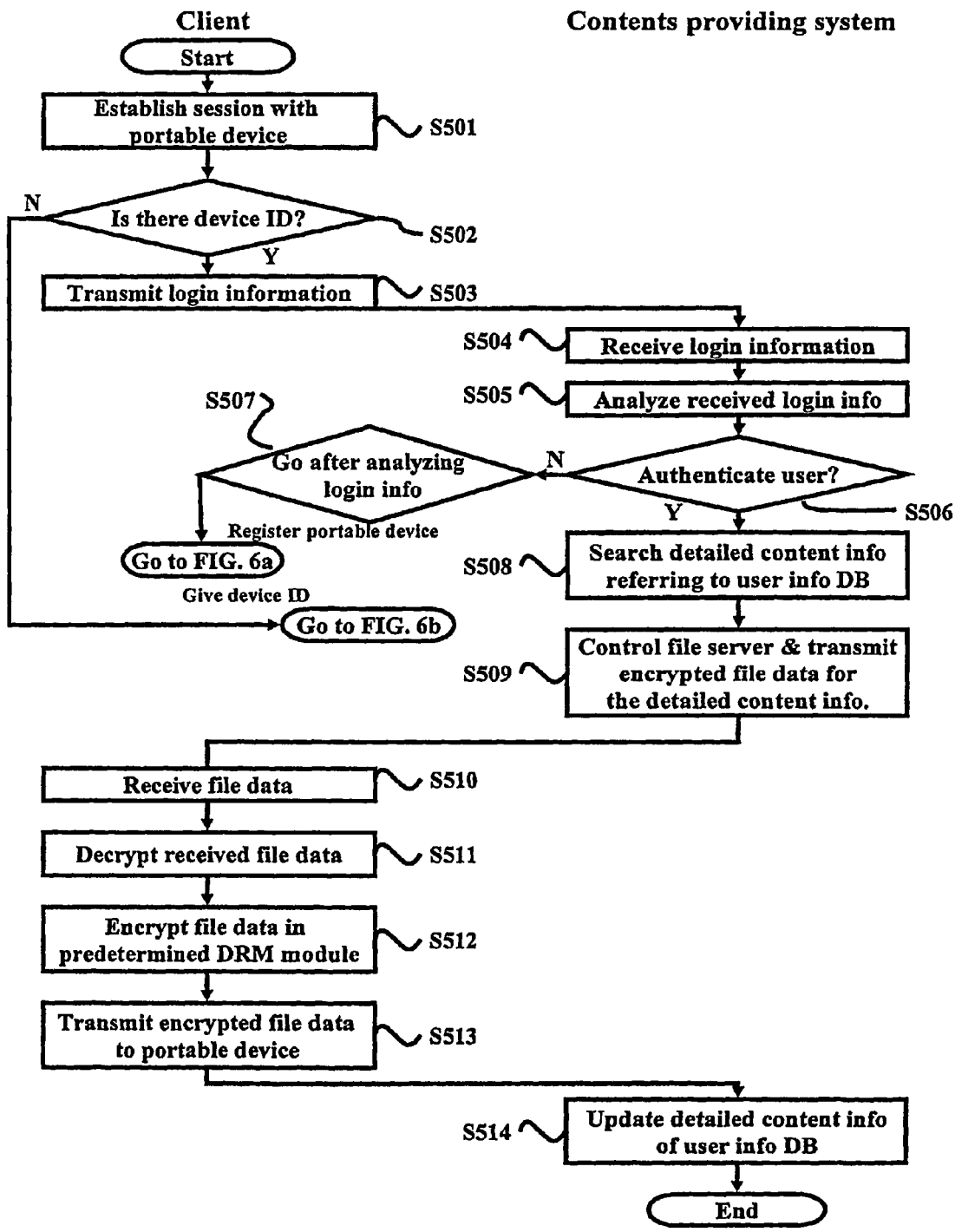
FIG. 5 is a flowchart illustrating one method of synchronizing data between a contents provider and a portable device via a network according to one embodiment of the present invention.

FIG. 5 is a flowchart illustrating one method of synchronizing data between a contents provider and a portable device via a network according to one embodiment of the present invention. The method illustrated in FIG. 5 may comprise the steps below:

The synchronization client establishes a session with the portable device in S501. At this time, the session establishment may be performed in a way of detecting connection state of the portable device and loading the synchronization driver of the synchronization client. When the session is established, the synchronization client determines whether a device ID is stored in the portable device in S502. If the device ID is stored, the synchronization client transmits login information to the contents providing system in S503, wherein the login information includes user authentication information (a user ID, a password, or a device ID) or contents information to be synchronized. The contents providing system receives the login information in S504. Unless the device ID is stored, i.e. if a new ID is required because the only given device ID has been deleted due to firmware upgrading of the portable device, the synchronization client goes to FIG. 6b and operates to receive the new device ID.

The contents providing system analyzes the received login information in S505 and determines whether the login information transmitted from the synchronization client is transmitted from a right user in S506 (a user authentication step). If he/she is the right user, the contents providing system searches contents list information corresponding to contents information that is included in the login information by referring to the user information database in S508, wherein the contents list information has been set by the user. The contents providing system abstracts corresponding file data by controlling the file server and transmits the abstracted file data to the synchronization client in S508.

The synchronization client receives the encrypted file data from the contents providing system in S510 and decrypts the received file data in S511. When contents is decrypted in S511, the synchronization client may allot specific area of a PC memory as a temporary buffer, decrypt the contents that is divided into a predetermined size and transmit the decrypted contents to the portable device. At this time, the portable device may restore the divided contents. That is, the decrypted file data may not be stored as a type of a temporary file (*.tmp) in a process of decryption and may decrypt at least one corresponding temporary buffer while hopping the same sequentially. This is to prevent unauthorized restoration of the corresponding decrypted file through memory dumping or the like.

According to one embodiment of the present invention, the synchronization client re-encrypts the decrypted file data through a predetermined encryption module in S512. This is to protect digital rights strongly in transmitting data between the portable device and contents. The synchronization client may transmit encrypted file data to the portable device through a predetermined connection method such as USB. At this time, the portable device may use the transmitted file data by decrypting the same.

If transmission of file data is completed normally, the contents providing system updates contents list information (e.g. downloading of corresponding contents, date downloaded) of the database 303 in S514.

Figure 6A:
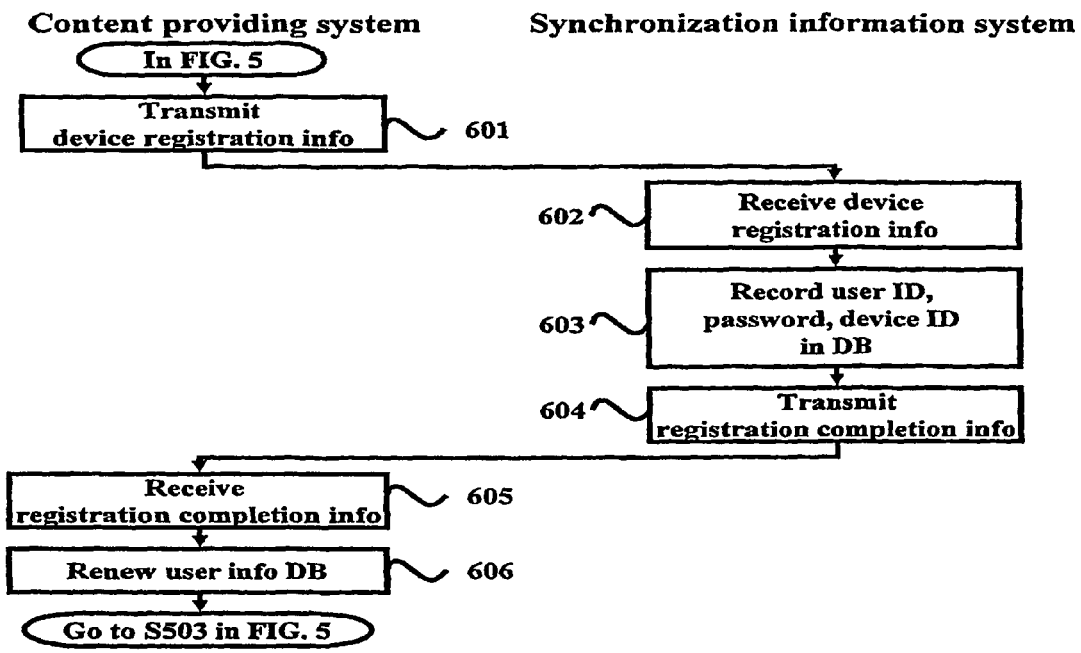
FIGS. 6a and 6b are flowcharts illustrating methods of registering a portable device and giving a device ID thereto according to one embodiment of the present invention.

Unless user authentication is performed normally, i.e. unless login information on the corresponding portable device is registered for the contents providing system, the contents providing system may operate to go to FIG. 6a (S507).

Figure 6B:
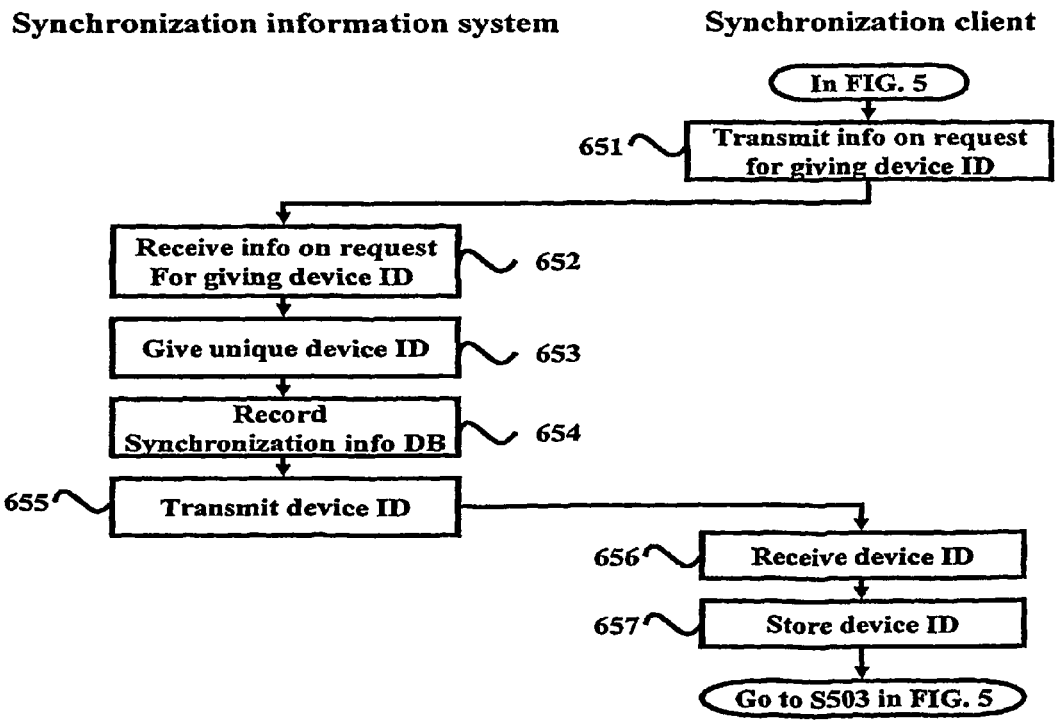

FIGS. 6a and 6b are flowcharts illustrating methods of registering a portable device and giving a device ID thereto according to one embodiment of the present invention.

FIG. 6a is a flowchart illustrating one method of requesting device registration according to one embodiment of the present invention.

If it is determined to perform the request of the device registration in S507, the contents proving system goes to the routine as illustrated in FIG. 6a The contents proving system transmits device registration information to the synchronization information system in S601. The device registration information may include a user ID, a password and a corresponding device ID. The contents proving system receives the device registration information in S602 and records the user ID, the password or the device ID, which is included in the information, in the aforementioned synchronization information database in S603. The synchronization information system transmits registration completion information on the corresponding portable device to the contents proving system in S604. The contents providing system receives the transmitted information in S605 and updates information on the corresponding portable device in S606, wherein the information is recorded in the database. Updating information of the database that is performed in S606 may be performed in a way of updating a field value from non-registration to registration, wherein the field value shows whether or not the user is registered. After updating the database, the contents providing system may go to S503 in FIG. 5 and perform contents synchronization service. According to another embodiment of the present invention, the present invention may be configured to omit steps S602 to S604, to perform the device ID registration routine only in the contents providing system and to periodically or non-periodically perform data synchronization with the synchronization information system in accordance with a method of embodying the contents proving system or characteristic of the system.

FIG. 6b is a flowchart illustrating one method of giving a device ID of a portable device according to one embodiment of the present invention.

If it is determined to give the device ID of the portable device in S502, go to a routine illustrated in FIG. 6b. The synchronization client transmits information on the request for the device ID to the synchronization information system in S651. The device registration information may include a user ID, a password, or a device ID) which a manufacturer has singly given to the portable device. The synchronization information system receives the information on the request for the device ID in S652 and gives the user ID, the password, or the unique device ID corresponding to the manufacturer device ID in S653, which is included in the received information. In S653, the corresponding device ID may have a size of eight bites. At this time, the device ID may be constituted of nation information, manufacturer information, product model information, product identification information, product manufacture number or serial number. The synchronization information system records the given device ID, user ID and password of the corresponding portable device in the aforementioned synchronization information database in S654. The synchronization information system transmits the device ID to the synchronization client in S655. The synchronization client receives the device ID in S656 and stores the same in S657. The device ID stored in S657 may be transmitted to the portable device and recorded in a predetermined memory means. After storing the device ID in the synchronization client or the portable device, the contents providing system may be go to S503 in FIG. 5 again and perform the contents proving system.

As aforementioned, all the login information or portable device related information that is transmitted from the synchronization client is managed by the synchronization information system. This is to perform management of the portable device integrally. That is, the unique device ID is given to every portable device and user information is managed by one synchronization information system. Therefore, a plurality of contents proving systems may be connected only if there is one user ID, one password, or unique device ID.

In the meantime, according to another embodiment of the present invention, decrypted contents may be re-encrypted through a predetermined encryption method before being transmitted to the portable device.

Figure 7A:
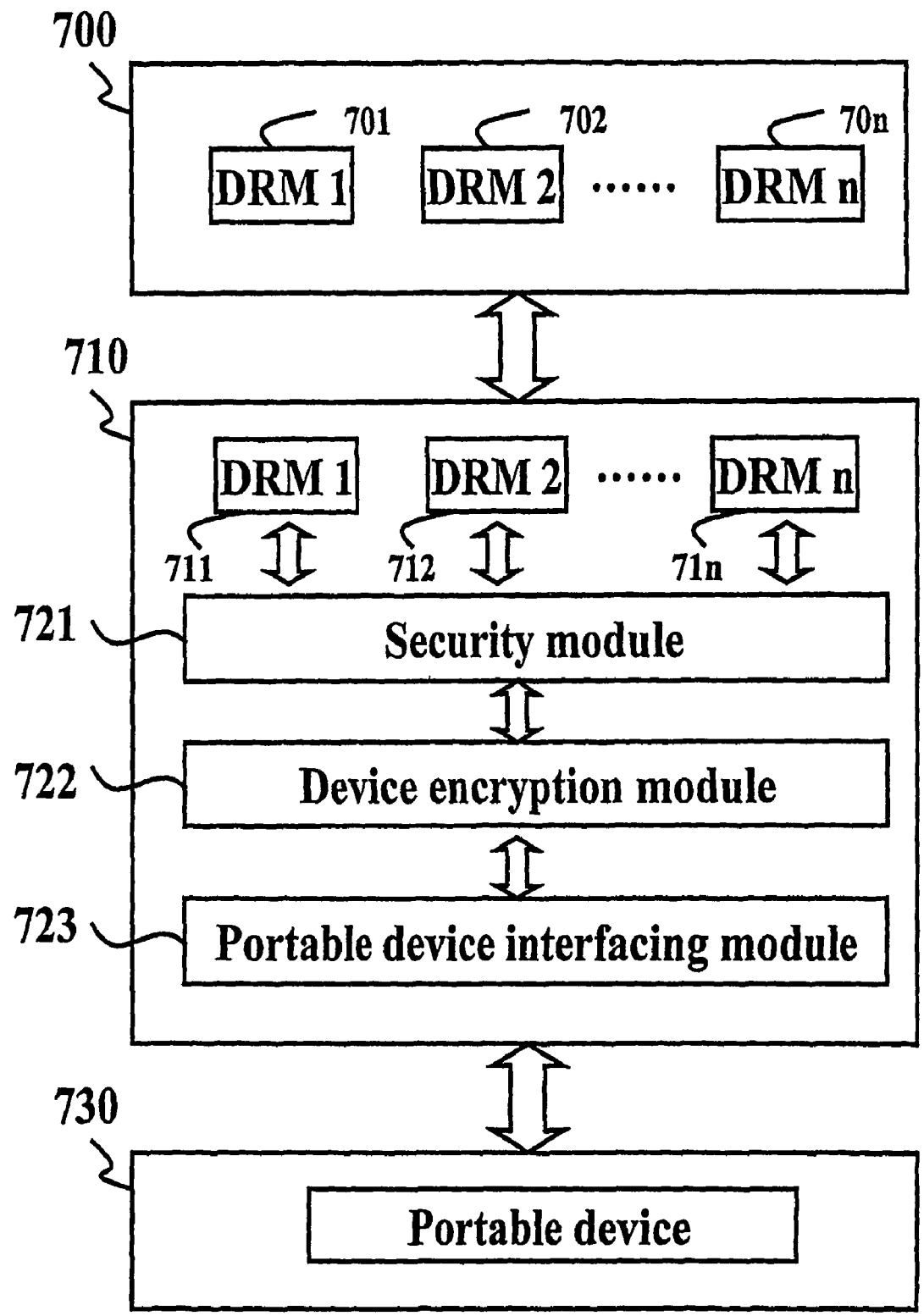
FIG. 7a is a block diagram illustrating configuration of a synchronization client of a portable device and a contents providing system via a network according to a first embodiment of the present invention.

FIG. 7a is a block diagram illustrating configuration of a synchronization client of a portable device and a contents providing system via a network according to a first embodiment of the present invention.

Referring to FIG. 7a, a contents providing system 700 has a plurality of DRM encryption modules 701~70n and provides the encrypted contents for the synchronization client after encrypting the user requesting contents in a respectively different DRM method for each contents provider.

Synchronization client 710 receives the encrypted file data corresponding to predetermined contents information from contents proving system 700 through communication therewith. Synchronization client 710 decrypts the received file data and encrypts the decrypted file data so that the same may be usable only in portable device 730. Synchronization client 710 transmits the encrypted file data to portable device 730. A respectively different encryption method may be applied for each contents provider of contents proving system 700. Therefore, the synchronization client 710 comprises a plurality of DRM decryption modules 711~71n to correspond to encryption methods of a plurality of DRM decryption modules 701~70n. A plurality of DRM decryption modules 711~71n may be upgraded continuously and, if contents proving system 700 adopts a new DRM method, may decrypt contents which is encrypted in the DRM encryption method by updating the DRM decryption module corresponding to the DRM encryption method.

Synchronization client 710 comprises a plurality of DRM decryption modules 711~71n, security module 721, device encryption module 722 and portable device interfacing module 723.

A plurality of DRM decryption modules 711~71n transmits user authentication information or user requesting contents information to contents proving system 700 and receives encrypted file data from contents proving system 700. At this time, the user authentication information may include at least one among a user ID, a password and a device ID of the portable device—the portable device ID has unique value. This device ID may be a product ID of the corresponding portable device. A plurality of DRM decryption modules 711~71n decrypt the received file data through a predetermined DRM module. The DRM module operates corresponding to a plurality of DRM decryption modules 701~70n that are equipped in contents providing system 700. This is to decrypt all the encrypted contents that are provided from contents providing system 700. A plurality of DRM decryption modules 711~71n may be embodied into at least one Dynamic Link Library (hereinafter, DLL) file. Like above, that the synchronization client decrypts the encrypted file data which is provided from the contents providing system is for solving the problem in the prior art. Portable device 730 in the prior art is required to have a respective decryption module for each encryption method, if encrypted file data has to be decrypted in the portable device or if an encryption method of the file data is different for each contents provider. That is, synchronization client 710 decrypts digital contents which are encrypted into various formats in contents providing system 700 and transmits the encrypted digital contents to portable device 730 after encrypting the decrypted digital contents in a predetermined DRM method, whereby portable device 730 may play the encrypted digital contents through one decryption module.

Security module 721 controls access to the decryption module. Therefore, if there is any access to the decryption module, security module 721 determines whether the accessing application program is authorized and controls access of the application program to the decryption module, based on the determination. Herein, access may comprise all the access to the file such as generate/open/read/write/delete, etc. Security module 721 may control access of the application program. For example, security module 721 may make a file itself of the decryption module unseen so that the application program such as explorer may not search the decryption module. Or security module 721 may control the application program in a way that the folder in which the file is stored is searched but not entered. Or, security module 721 may control the application program in a way that other application programs beside the application program which is permitted to access the file may not access the file, although the file of the folder is seen.

Security module 721 watches all the access to an OS file system through a filter driver or a device driver of a hooking method and permits the application program which is accessible to the decryption module to access the same. Security module 721 stores the encrypted file in the decryption module by using a predetermined encryption key method and watches the application program, which wants to access the decryption module, through the driver. If the application program is permitted to access, security module 721 decrypts the encrypted file in real time and transmits the decrypted file to the application program.

Unless security module 721 works normally due to an attack of an ill program such as a hacking program or due to the self-defect, other program beside the application program that is permitted to access may access the decryption module without authorization. At this time, the decryption module may be exposed in a type of the encrypted file. However, since a file itself of the decryption module is in the type of the encrypted file, it may be impossible to decrypt the encrypted digital contents normally through the file of the encrypted decryption module.

Like above, although security module 721 does not operate normally and the file of the encrypted decryption module is accessed without authorization, it is impossible to decrypt the encrypted digital contents unless the file of the encrypted decryption module is decrypted. Therefore, although the encrypted digital contents are copied unauthorized, if not decrypted, it may not be used normally.

If a predetermined application program wants to access the decryption module by including predetermined authentication information in the driver, security module 721 transmits the authentication information to the decryption module and performs authentication, wherein the driver operates when accessing the decryption module. At this time, if the application program is authenticated, security module 721 may enable it to access the decryption module.

In order to maintain the security of the decrypted data, security module 721 may prevent access of other application program to a memory in which the decrypted data is stored, unless it is the case that device encryption module 722 encrypts the decrypted data. If other application beside the encryption module accesses the decrypted file data, the decrypted file data may be copied without authorization and distributed or used illegally. Therefore, this is one solution for preventing the aforementioned problem. Security module 721 enables file data which is managed in a plurality of DRM decryption modules 711~71n to be accessible only through a kernel level of an Operating System (OS), whereby security module 721 may control other application program in a way that the decrypted file data may not be usable in other application program.

Device encryption module 722 accesses and encrypts the decrypted file data so that the file data may be usable only in the predetermined portable device. Device encryption module 722 may operate corresponding to the decryption module of the portable device and encrypt user authentication information of portable device 730 in the decrypted file data by using an encryption key. Device encryption module 722 may encrypt corresponding contents using a predetermined authentication key or certificate for encryption of contents that is transmitted to portable device 730.

Portable device interfacing module 723 transmits the encrypted file data to portable device 730 and receives the user authentication information or the user requesting contents information from portable device 730. The contents information includes information on the contents which the user wants to use.

Portable device 730 receives the encrypted file data from synchronization client 710 and decrypts the received file data through the predetermined decryption module. The decryption module operates corresponding to device encryption module 722 of synchronization client 710. The decryption module may decrypt the encrypted file data by using the corresponding user authentication information of portable device 730, wherein the file data is encrypted in device encryption module 722 of synchronization client 710.

Figure 7B:
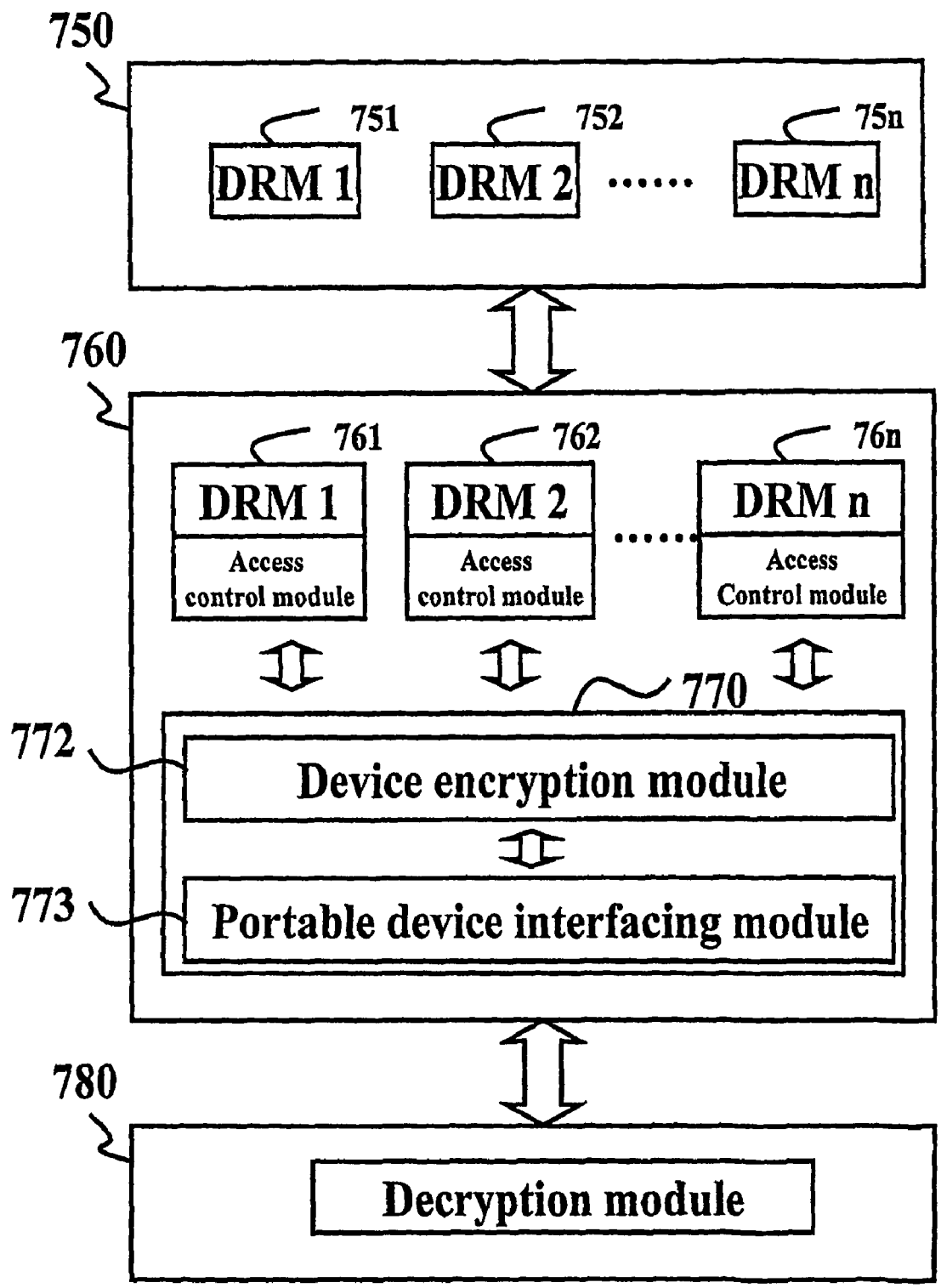
FIG. 7b is a block diagram illustrating configuration of a synchronization client of a portable device and a contents providing system via a network according to a second embodiment of the present invention.

FIG. 7b is a block diagram illustrating configuration of a synchronization client of a portable device and a contents providing system via a network according to a second embodiment of the present invention.

Referring to FIG. 7b, contents providing system 750 has a plurality of DRM encryption modules 751~75n and provides user requesting contents to synchronization client 760 after encrypting the contents in a respectively different DRM method for each contents provider.

Synchronization client 760 may comprise a plurality of decryption packages 761~76n and device decryption package 770. Synchronization client 760 receives encrypted file data corresponding to predetermined contents information from contents providing system 750 through communication therewith, Synchronization client. 760 may maintain the DRM decryption module and an application access control module in a plurality of decryption packages 761~76n, wherein the DRM decryption module decrypts the encrypted file data which is provided from contents providing system 750 and the application access control module controls an application which accesses the DRM decryption module or the decrypted file data therein.

A respectively different encryption method may be applied for each contents provider of contents providing system 750. Therefore, the DRM decryption module may be designed to perform at least one decryption routine. This is so that the DRM decryption module may correspond to encryption methods of DRM encryption modules 751~75n. Whenever there is an advent of a new DRM method, the DRM decryption module may be continuously updated and, if contents providing system 750 adopts the new DRM method, may decrypt the corresponding contents through upgrading. The DRM decryption module operates corresponding to a plurality of DRM encryption modules 751~75n of contents providing system 750. This is so that the DRM decryption module may decrypt all the encrypted contents that are provided from contents providing system 750. Like above, that synchronization client 760 decrypts the encrypted file data which is provided from contents providing system 750 is for solving the problem in the prior art. If portable device 780 decrypts the file data or if an encryption method of the file data is different for each contents provider, portable device 780 in the prior art is required to have a respective decryption module for each encryption method. That is, a plurality of decryption packages 761~76n decrypts digital contents which is encrypted into various formats in contents providing system 750 and transmits the encrypted digital contents to portable device 780 after encrypting the decrypted digital contents in the predetermined DRM method, whereby portable device 730 may play the encrypted digital contents through one decryption module.

The application access control module permits/prevents the application's access to the DRM decryption module or to the file data that has been decrypted therein, based on whether or not device synchronization package 770 that requests the file data is an authenticated application. If device synchronization package 770 is an authenticated application, the application access control module permits device synchronization package 770 to access the DRM decryption module or to access the file data, wherein the file data is decrypted through the DRM decryption module. The application access control module watches an application's request for access to the decrypted file data or the application's access to the DRM decryption module itself, wherein the application operates in device synchronization package 770. If there is the request for access to the decrypted file data or if there is access to the DRM decryption module, the application access control module determines whether the application is authenticated and enables the application to access the decrypted file data or the DRM decryption module based on the determination.

The file data decrypted through the DRM decryption module is transmitted to device synchronization package 770. This is one solution for preventing the unauthorized copy and illegal distribution. Because, if other application besides device synchronization package 770 according to the present invention is accessible to the decrypted file data or the DRM module, the decrypted file data may be copied without authorization and distributed or used illegally.

Device synchronization package 770 may comprise device encryption module 772 and portable device interfacing module 773. Device synchronization package 770 accesses the decrypted file data and encrypts the same through device encryption module 772 and transmits the encrypted file data to portable device interfacing module 773, wherein the file data includes user authentication information of the portable device. The user authentication information may include at least one among a user ID, a password, and the user's portable device ID—the portable device ID has unique value. This device ID may be a product ID of the corresponding portable device.

Device encryption module 772 accesses the file data, which is decrypted from a plurality of decryption packages 761~76n, through a predetermined application and encrypts the decrypted file data so that the file data may be usable only in the predetermined portable device. Device encryption module 772 may operate corresponding to the decryption module of portable device 780 and encrypt user authentication information of portable device 780 in the decrypted file data by using the encryption key. The device encryption module 772 may be configured to encrypt the contents using the predetermined authentication key or certificate. This is for encryption of the contents which is transmitted to portable device 780.

Portable device interfacing module 773 transmits the encrypted file data to portable device 780 and receives the user authentication information or the user requesting contents information from portable device 780. The contents information includes information on contents that the user wants to use.

Portable device 780 receives encrypted file data from synchronization client 760 and decrypts the received file data through the predetermined decryption module. The decryption module operates corresponding to device encryption module 772 of synchronization client 760. The decryption module may decrypt file data by using the corresponding user authentication information of portable device 780, wherein the file data is encrypted in device encryption module 772 of synchronization client 760.

As aforementioned, if the decrypted contents in the synchronization client are re-encrypted through the predetermined encryption method before being transmitted to the portable device, contents that is transmitted between the contents providing system and the portable device is encrypted once more. Therefore, digital right may be protected more strongly. That is, if contents data that is transmitted between the synchronization client and the portable device is not encrypted, the corresponding contents may be copied without authorization through a plurality of portable devices. It is because the portable is currently used as mass storage. Therefore, digital right of the corresponding contents may be protected through prevention of the unauthorized copy.

The synchronization client is required to have at least one decryption module for decrypting encrypted contents in at least one contents providing system. However, the portable device is only required to have one decryption module for decrypting contents that is transmitted from the synchronization client. Therefore, loads of the portable device may be reduced.

Figure 8:
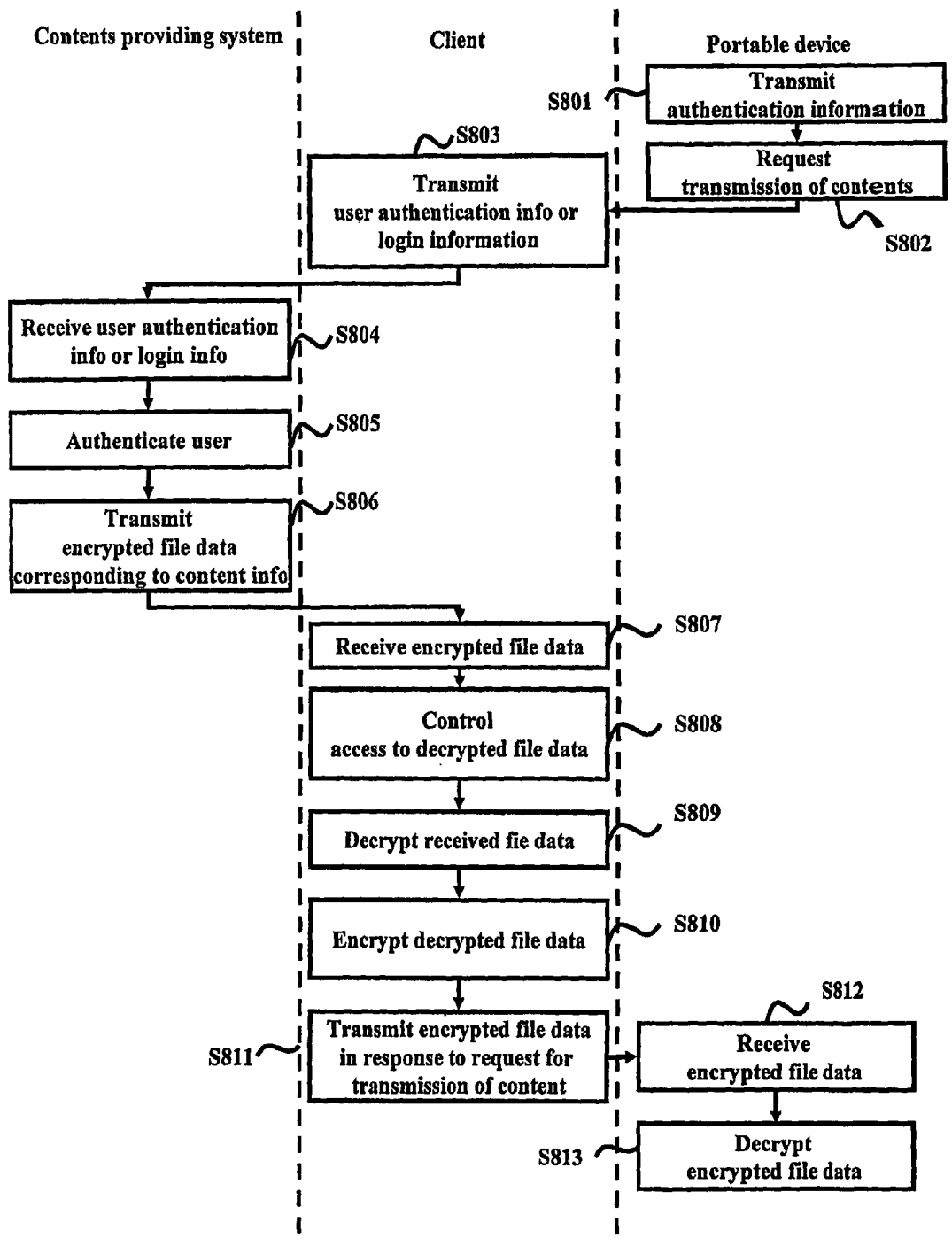
FIG. 8 is a flowchart illustrating one method of synchronizing data between a contents providing system and a portable device via a network according to another embodiment of the present invention.

FIG. 8 is a flowchart illustrating one method of synchronizing data between a contents providing system and a portable device via a network according to another embodiment of the present invention.

Referring to the FIG. 8, the portable device transmits user authentication information and contents information to the synchronization client in S801 and S802. The user authentication information includes at least one among a user ID, a password and the user's portable device ID, wherein the portable device ID has unique value. The contents information includes information on contents that the user wants to use in the portable device.

The synchronization client transmits the user authentication information and contents information, which is respectively received in S801 and S802, to the contents providing system in S803. The contents providing system receives the same from the synchronization client in S804. The contents information includes information on contents that the user wants to use in the portable device. The contents providing system authenticates a user through the received user authentication information. The user authentication is a general process of identifying the user using the user ID, the password or the user's device ID that is included in the received user authentication information. In the step of user authentication, the user is identified. At this time, if the user wants to use paid contents, it may be possible to confirm a method of paying a fee of the contents. If the user authentication is completed, the contents providing system searches contents that is stored in a predetermined database according to the received contents information and transmits encrypted file data corresponding to the received contents information to the synchronization client in S806. An encryption method of the encrypted file data may be different for each contents providing system. The synchronization client receives the encrypted file data corresponding to the contents information in S807, wherein the contents information is transmitted from the predetermined contents providing system.

The security module of the synchronization client controls the application's access to the decryption module in S808 so that the application, which is not permitted to access the predetermined decryption module, may not access the same. S808 is a process for preventing unauthorized copy or transformation by controlling the application's access to the decryption module, wherein only the application program that is permitted to access the decryption module may access and decrypt the encrypted file and the application that is not permitted to access may not access the decryption module. The decryption module may be controlled to be accessed only through the kernel level of the operating system. The decryption module is stored as a type of the encrypted file by a predetermined encryption key method. If the application program that wants to access the decryption module is permitted one, the encrypted file is decrypted in real time and transmitted to the application program.

The synchronization client decrypts the received file data through the predetermined decryption module in S809. The decryption module may be composed of at least one Dynamic Link Library file. The decryption is performed to correspond to encryption that is performed through the encryption module of the contents providing system so that respective file data may be decrypted, wherein the file data is encrypted in a respectively different encryption method that is provided from a respectively different contents providing system. The synchronization client encrypts the decrypted file data again in S810 so that the decrypted file data may be usable only in the portable device. S810 is a process for enabling the encrypted file data to be decrypted by encrypting the decrypted file data only if there is one decryption module in the portable device, wherein S810 corresponds to the predetermined encryption module mounted on the portable device. The synchronization client responds to the received request for transmitting the contents and transmits the encrypted file data to the portable device in S811. The portable device receives the encrypted file data from the synchronization client in S812 and decrypts the encrypted file data through the predetermined decryption module in S813.

The embodiments of the present invention include computer readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The media may also be a transmission medium such as optical or metallic lines, wave guides, etc. including a carrier wave transmitting signals specifying the program instructions, data structures, etc. Examples of program instructions include both machine code, such as produced by a compiler, and files containing higher level code that may be executed by the computer using an interpreter.

Figure 9:
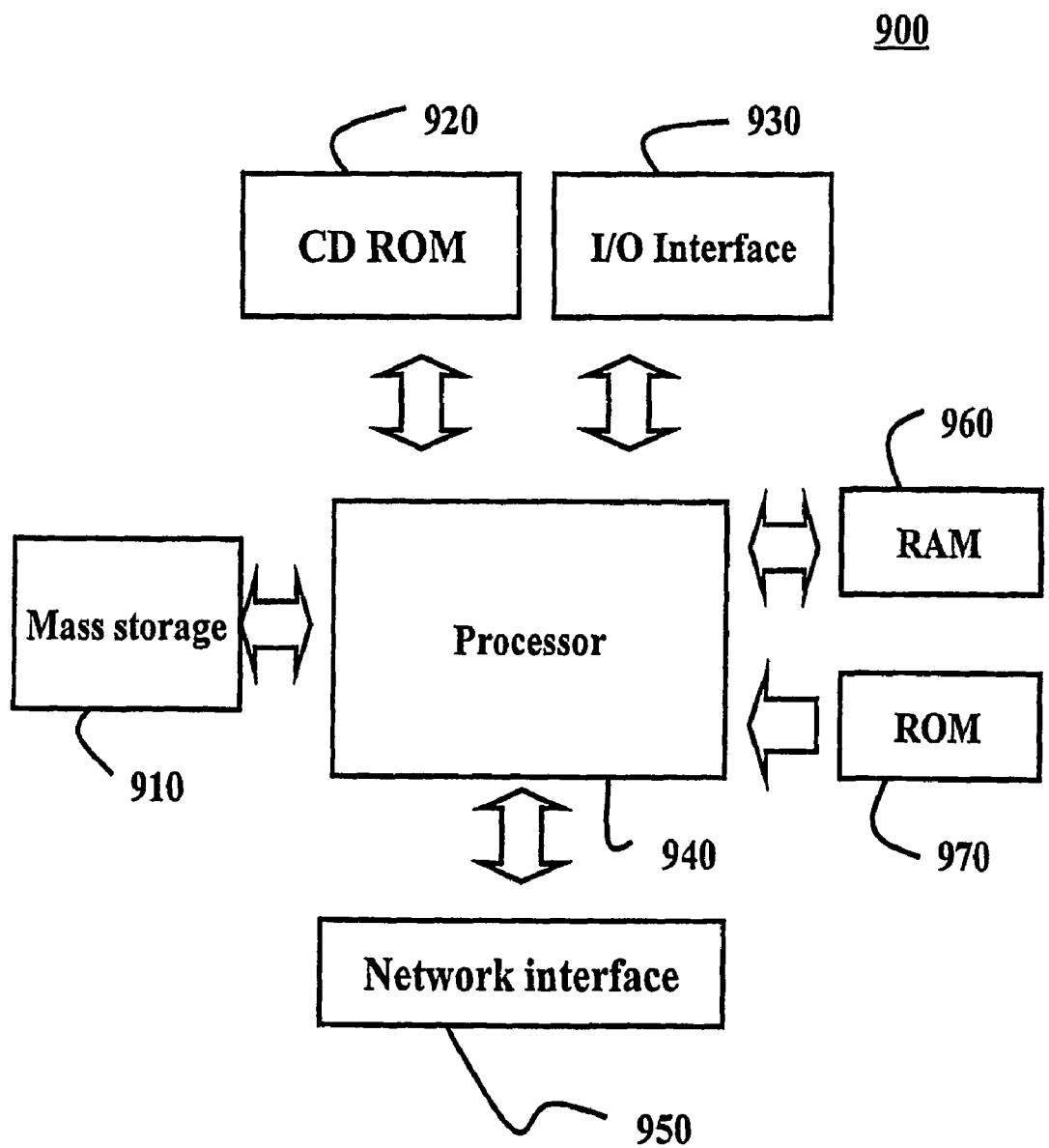
FIG. 9 is an internal block diagram of a general purpose computer which may be adopted in a method for synchronizing data between a contents provider and a portable device via a network according to the present invention.

FIG. 9 is an internal block diagram of a general-purpose computer which can be more adopted in implementing the method of synchronizing data between a contents provider and a portable device via a network according to the present invention.

Computer system 900 includes any number of processors 940 (also referred to as central processing units, or CPUs) that are coupled to storage devices including primary storage (typically a random access memory, or "RAM 960"), primary storage (typically a read only memory, or "ROM 970"). As is well known in the art, ROM 970 acts to transfer data and instructions uni-directionally to the CPU and RAM 960 is used typically to transfer data and instructions in a bi-directional manner. Both of these primary storage devices may include any suitable type of the computer-readable media described above. Mass storage device 940 is also coupled bi-directionally to CPU and provides additional data storage capacity and may include any of the computer-readable media described above. The mass storage device 910 may be used to store programs, data and the like and is typically a secondary storage medium such as a hard disk that is slower than primary storage. A specific mass storage device such as CD-ROM 920 may also pass data uni-directionally to CPU. Processor 940 is also coupled to network interface 950 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, processor 940 optionally may be coupled to a computer or telecommunications network using a network connection as shown generally at 950. With such a network connection, it is contemplated that the CPU might receive information from the network, or might output information to the network in the course of performing the above-described method steps. The above-described devices and materials will be familiar to those of skill in the computer hardware and software arts.

The hardware elements above may be configured to act as one or more software modules for implementing the operations of this invention.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. Therefore, it is intended that the scope of the invention be defined by the claims appended thereto and their equivalents.

INDUSTRIAL APPLICABILITY

According to the present invention, a method and system of synchronizing data between a contents providing system and a portable device via a network may provide a method of decrypting digital contents encrypted into various formats in one synchronization client and of transmitting the digital contents to a personal device.

Further, according to the present invention, the method and system decrypts digital contents encrypted into various formats in one synchronization client and transmits the encrypted digital contents to the personal device after encrypting the decrypted digital contents in a predetermined DRM method. In addition, the method and system enables the portable device to play the encrypted digital contents through one decryption module. Therefore, the present invention may protect digital right more strongly and support the DRM method of various formats.

Furthermore, according to the present invention, the method and system enables at least one digital contents to be transmitted from at least one contents providing system if there is one-connection through one synchronization client. Therefore, the present invention may reduce the inconvenience of a user who should input a user ID and a password separately in the conventional contents providing systems and enable the user to receive digital contents which the user wants to use through one logic channel.

Furthermore, according to the present invention, the method and system decrypts digital contents encrypted into various formats in one synchronization client, encrypts the decrypted digital contents so that the same is usable only in a predetermined portable device, and transmits the encrypted digital contents to the portable device, wherein the portable device is enabled to play the encrypted digital contents through one decryption module. Therefore, the present invention may protect digital rights more strongly and support the DRM method of various formats.

Furthermore, according to the present invention, the method and system is accessible only when digital contents encrypted into various formats is decrypted in one synchronization client and the decrypted digital contents is encrypted. Therefore, the present invention may prevent unauthorized copy of digital contents which may be caused by unauthorized access to decrypted file data.

The invention claimed is:

1. A synchronization client for synchronizing data between a contents providing system and a portable device, the synchronization client comprising:
   a memory for storing a plurality of DRM (Digital Rights Management) decryption parts;
   the plurality of DRM (Digital Rights Management) decryption parts, on a single personal computer (PC), that each receive respective encrypted file data, from the contents providing system, corresponding to user requesting contents information and that each decrypt the received respective encrypted file data, wherein the plurality of DRM decryption parts each operate a respective different encryption method corresponding to a DRM encryption part of the contents providing system;

a device encryption part, on the single PC, that operates corresponding to a predetermined decryption part of the portable device and that encrypts a decrypted file data from at least one of the plurality of DRM decryption parts by using user authentication information from the portable device, wherein the user authentication information includes at least one of a user ID, a password, and a device ID of the portable device; a security part, on the single PC, that controls access by a given application to each of the DRM decryption parts and where the given application is authenticated, permitting the given application's access to at least one of the DRM decryption parts and the respective decrypted file data therein; and a portable device interfacing part, on the single PC, that transmits the encrypted file data from the device encryption part on the single PC to the portable device and that receives the user authentication information and the user requesting contents information from the portable device.

* * * * *